United States Patent
Watanabe et al.

(10) Patent No.: US 10,361,600 B2
(45) Date of Patent: Jul. 23, 2019

(54) ROTOR FOR MOTOR, AND MOTOR

(71) Applicant: MITSUBISHI HEAVY INDUSTRIES THERMAL SYSTEMS, LTD., Tokyo (JP)

(72) Inventors: Yasuhiro Watanabe, Kiyosu (JP); Atsushi Suzuki, Kiyosu (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 121 days.

(21) Appl. No.: 15/522,060

(22) PCT Filed: Nov. 2, 2015

(86) PCT No.: PCT/JP2015/080905
§ 371 (c)(1),
(2) Date: Apr. 26, 2017

(87) PCT Pub. No.: WO2016/072379
PCT Pub. Date: May 12, 2016

(65) Prior Publication Data
US 2017/0317544 A1    Nov. 2, 2017

(30) Foreign Application Priority Data
Nov. 5, 2014   (JP) .................................. 2014-225504

(51) Int. Cl.
*H02K 1/27*    (2006.01)
*H02K 1/28*    (2006.01)

(52) U.S. Cl.
CPC ............... *H02K 1/28* (2013.01); *H02K 1/276* (2013.01); *H02K 2201/09* (2013.01)

(58) Field of Classification Search
CPC ....... H02K 1/28; H02K 1/276; H02K 2201/09
(Continued)

(56) References Cited

U.S. PATENT DOCUMENTS

| | | | |
|---|---|---|---|
| 5,481,148 A * | 1/1996 | Moribayashi | H02K 1/17 310/154.16 |
| 7,456,539 B2 * | 11/2008 | Matsumoto | H02K 1/276 310/156.21 |

(Continued)

FOREIGN PATENT DOCUMENTS

| | | |
|---|---|---|
| JP | 11-332146 A | 11/1999 |
| JP | 2000-341920 A | 12/2000 |

(Continued)

OTHER PUBLICATIONS

International Search Report (Form PCT/ISA/210) issued in International Application No. PCT/JP2015/080905, dated Jan. 12, 2016, together with an English translation.

(Continued)

*Primary Examiner* — Bernard Rojas
*Assistant Examiner* — Ahmed Elnakib
(74) *Attorney, Agent, or Firm* — Birch, Stewart, Kolasch & Birch, LLP

(57) ABSTRACT

A rotor for a motor is provided with: a stacked core made of a plurality of steel plates stacked on top of each other in a direction of an axis of a rotating shaft, has a circular pillar shape centered around the axis, and is provided with a plurality of magnet insertion grooves arranged in a circumferential direction of the rotor and penetrating through the circular pillar shape in the direction of the axis; permanent magnets respectively inserted into the magnet insertion grooves; a pair of end plates respectively stacked on opposite ends of the stacked core in the direction of the axis and closing the magnet insertion grooves; and a pressing portion restraining the permanent magnet in the direction of the axis by pressing the permanent magnet in the direction of the axis.

2 Claims, 13 Drawing Sheets

(58) Field of Classification Search
USPC ............ 310/156.01, 156.08, 156.16, 156.17, 310/156.22, 156.24, 156.27, 156.53, 310/156.56, 156.74
See application file for complete search history.

(56) References Cited

U.S. PATENT DOCUMENTS

| | | | | |
|---|---|---|---|---|
| 7,737,592 | B2 * | 6/2010 | Makino | H02K 1/276 310/156.09 |
| 7,948,137 | B2 * | 5/2011 | Ohyama | H02K 1/276 310/156.01 |
| 7,986,068 | B2 * | 7/2011 | Suzuki | H02K 1/28 310/156.22 |
| 8,970,085 | B2 * | 3/2015 | Takahashi | H02K 1/276 310/216.114 |
| 2008/0111435 | A1 * | 5/2008 | Maeda | H02K 1/2733 310/156.28 |
| 2009/0127962 | A1 * | 5/2009 | Ohyama | H02K 1/276 310/156.53 |

FOREIGN PATENT DOCUMENTS

| | | | |
|---|---|---|---|
| JP | 2001-251795 | A | 9/2001 |
| JP | 2001251795 | * | 9/2001 |
| JP | 2003-299277 | A | 10/2003 |
| JP | 2009-213291 | A | 9/2009 |
| JP | 2012-29343 | A | 2/2012 |
| JP | 2013-181106 | A | 9/2013 |

OTHER PUBLICATIONS

Written Opinion of the International Searching Authority (Form PCT/ISA/237) issued in International Application No. PCT/JP2015/080905, dated Jan. 12, 2016, together with an English translation.

* cited by examiner

ROTOR FOR MOTOR, AND MOTOR

TECHNICAL FIELD

The present invention relates to a rotor for a motor and to a motor.

This application claims priority based on Japanese Patent Application No. 2014-225504 filed in Japan on Nov. 5, 2014, of which the contents are incorporated herein by reference.

BACKGROUND ART

An inner rotor-type permanent magnet embedded synchronous motor (an Interior Permanent Magnet (IPM) motor) is provided with a rotating shaft, a rotor held by the rotating shaft, a stator arranged on the outer circumference of the rotor, and a yoke supporting the rotating shaft and the stator. The rotor of the IPM motor is provided with a cylindrical core made of non-oriented electromagnetic steel plates, permanent magnets attached to the core, and end plates that prevent the permanent magnets from coming loose from the core. The permanent magnets of the IPM motor are arranged inside slit-shaped through-holes formed in the core.

Conventionally, for the purpose of simplifying an assembly of the permanent magnets to the core and for preventing thermal stress from occurring due to a change in temperature, each of the permanent magnets arranged inside the through-holes is designed to be smaller than the size of each of the through-holes formed in the core.

With respect to the rotor for the motor to which the permanent magnets are fixed, technologies disclosed in Patent Documents 1 and 2 are known, for example.

CITATION LIST

Patent Literature

Patent Document 1: Japanese Unexamined Patent Application Publication No. 2000-341920A
Patent Document 2: Japanese Unexamined Patent Application Publication No. 2003-299277A

SUMMARY OF INVENTION

Technical Problem

With the rotor of the IPM motor, a rotation balance of the rotor easily changes when the permanent magnets move with respect to the core. Further, measurement and correction of the rotation balance of the rotor changed by the movement of the permanent magnets with respect to the core is difficult. Even if the rotation balance is adjusted when manufacturing the IPM motor, optimization of the rotation balance of the rotor is difficult. As a result, vibration and noise are generated when the rotor rotates.

The present invention provides a rotor for a motor that operates with low vibration and noise, and a motor.

Solution to Problem

In a rotor for a motor according to a first aspect of the present invention, the rotor includes: a rotor core made of a plurality of steel plates stacked on top of each other in a direction of an axis of a rotating shaft, having a circular pillar shape centered around the axis, and being provided with a plurality of magnet insertion grooves arranged in a circumferential direction of the rotor and penetrating through the circular pillar shape in the direction of the axis; permanent magnets respectively inserted into the magnet insertion grooves; a pair of end plates respectively stacked on opposite end surfaces of the rotor core in the direction of the axis and closing the magnet insertion grooves; and a pressing portion restraining the permanent magnet in the direction of the axis by pressing the permanent magnet in the direction of the axis.

The rotor for the motor according to the above-described aspect suppresses the movement of the permanent magnet inside the rotor core by the pressing portion pressing the permanent magnet in the direction of the axis of the rotating shaft.

In the rotor for the motor according to a second aspect of the present invention, the pressing portion of the above-described first aspect may be a part of the end plate, have elasticity, and press the permanent magnet in the direction of the axis as a result of the elasticity.

In this case, since the pressing portion is a part of the end plate, a number of parts is small, and production becomes easy.

In the rotor for the motor according to a third aspect of the present invention, the pressing portion of the above-described second aspect may have a contact surface that is oriented toward the permanent magnet, is inclined in a direction away from the axis, and comes into contact with the permanent magnet.

In this case, the contact surface holds the permanent magnet in a state in which the contact surface presses the permanent magnet in a direction of a centrifugal force that acts on the permanent magnet when the rotor for the motor rotates.

In the rotor for the motor according to a fourth aspect of the present invention, the permanent magnet of the above-described second or third aspect may have a contact receiving surface that is oriented toward the pressing portion, is inclined in a direction approaching the axis and comes into contact with the pressing portion.

In this case, the contact receiving surface is pressed by the pressing portion in the direction of the centrifugal force that acts on the permanent magnet when the rotor for the motor rotates.

The rotor for the motor according to a fifth aspect of the present invention, the pressing portion of the above-described first aspect may be a spring that is arranged between the permanent magnet and the end plate inside the magnet insertion groove and that has a biasing force that presses the permanent magnet in a direction away from the end plate.

In this case, in a state in which the spring is contracted inside the magnet insertion groove, the spring generates the biasing force in a direction in which the permanent magnet and the end plate move away from each other. Thus, the spring can maintain a constant biasing force while functioning as a buffer against the expansion and contraction of each part caused by a change in temperature. As a result, thermal stress is unlikely to occur, and the movement of the permanent magnet inside the rotor core can be suppressed.

In the rotor for the motor according to a sixth aspect of the present invention, the pressing portion of the above-described first aspect may be a filler that is arranged between the permanent magnet and the end plate and has a restoring force that separates the permanent magnet and the end plate by a predetermined distance when the permanent magnet and the end plate come closer to each other than the predetermined distance.

In this case, the movement of the permanent magnet inside the rotor core is regulated by the restoring force of the filler only when a force that causes the permanent magnet to move inside the magnet insertion groove is applied.

A motor according to a seventh aspect of the present invention includes: the rotor for the motor according to any one of the above-described first to six aspects; a stator arranged on an outer circumference of the rotor for the motor; and a yoke supporting the rotating shaft and the stator.

Advantageous Effects of Invention

As described above, the present invention can provide the rotor for the motor that operates with low vibration and noise, and the motor.

DESCRIPTION OF EMBODIMENTS

First Embodiment

Figure 1:
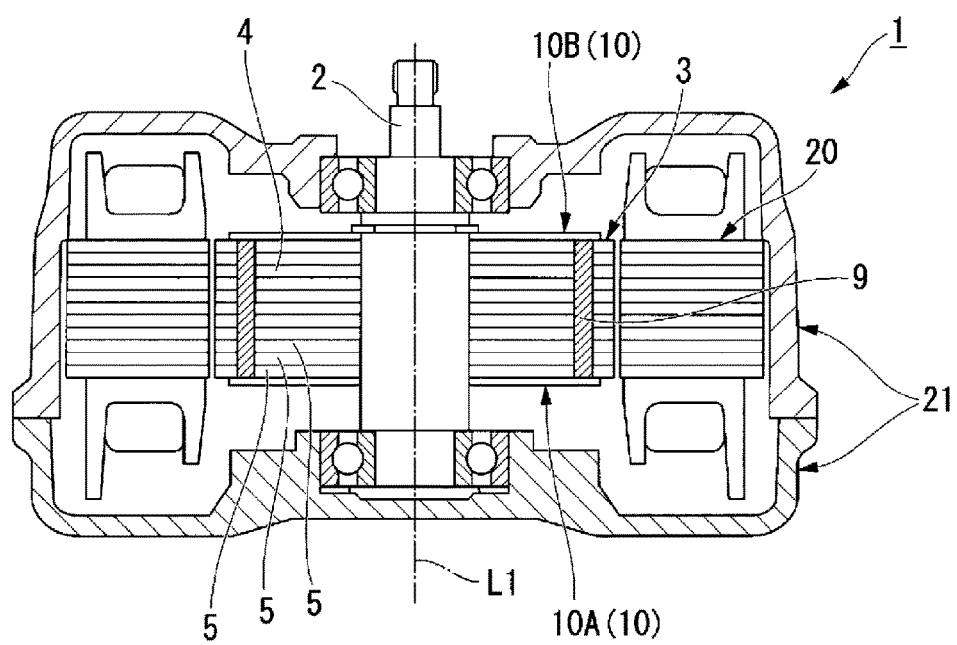
FIG. 1 is a cross-sectional view of a motor provided with a rotor for a motor according to a first embodiment of the present invention.
Figure 2:
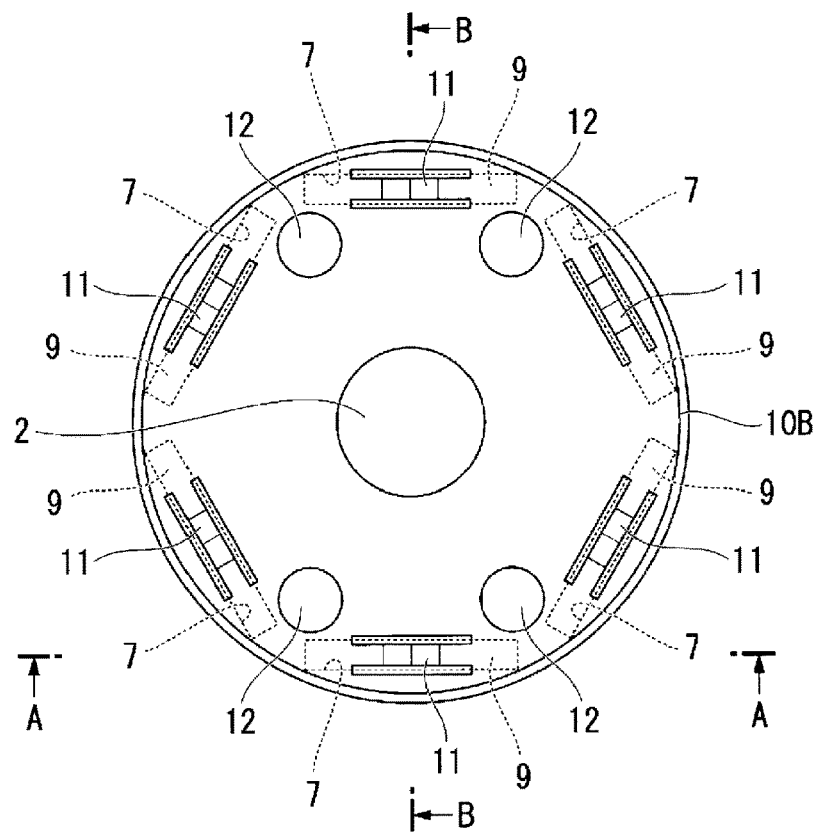
FIG. 2 is a plan view of the rotor for the motor.
Figure 3:
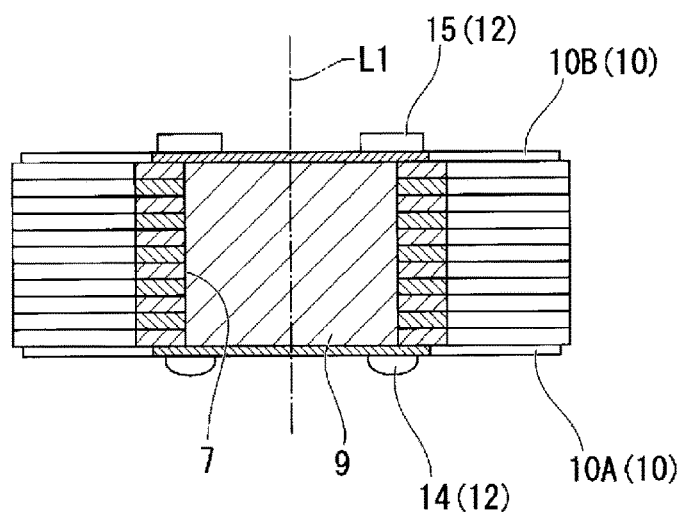
FIG. 3 is a cross-sectional view taken along the line A-A in FIG. 2.
Figure 4:
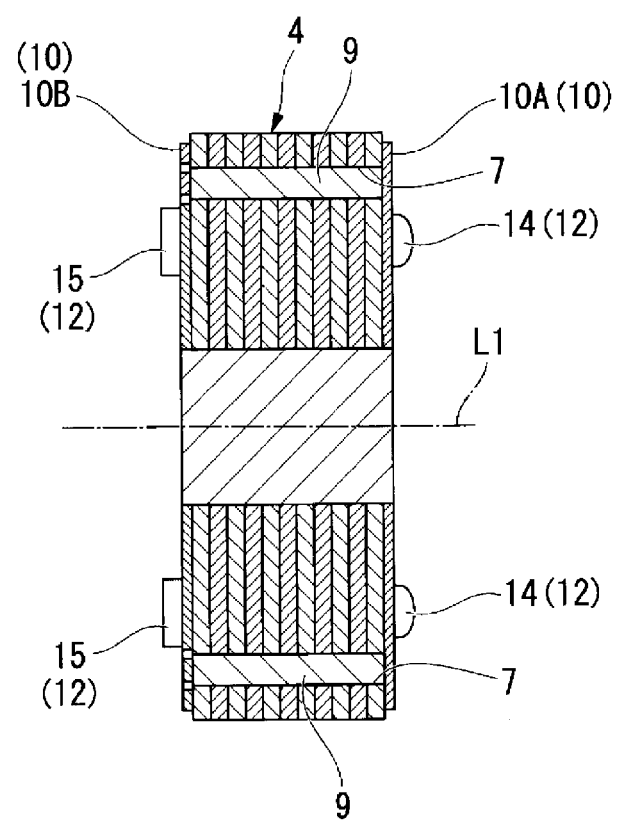
FIG. 4 is a cross-sectional view taken along the line B-B in FIG. 2.
Figure 5:
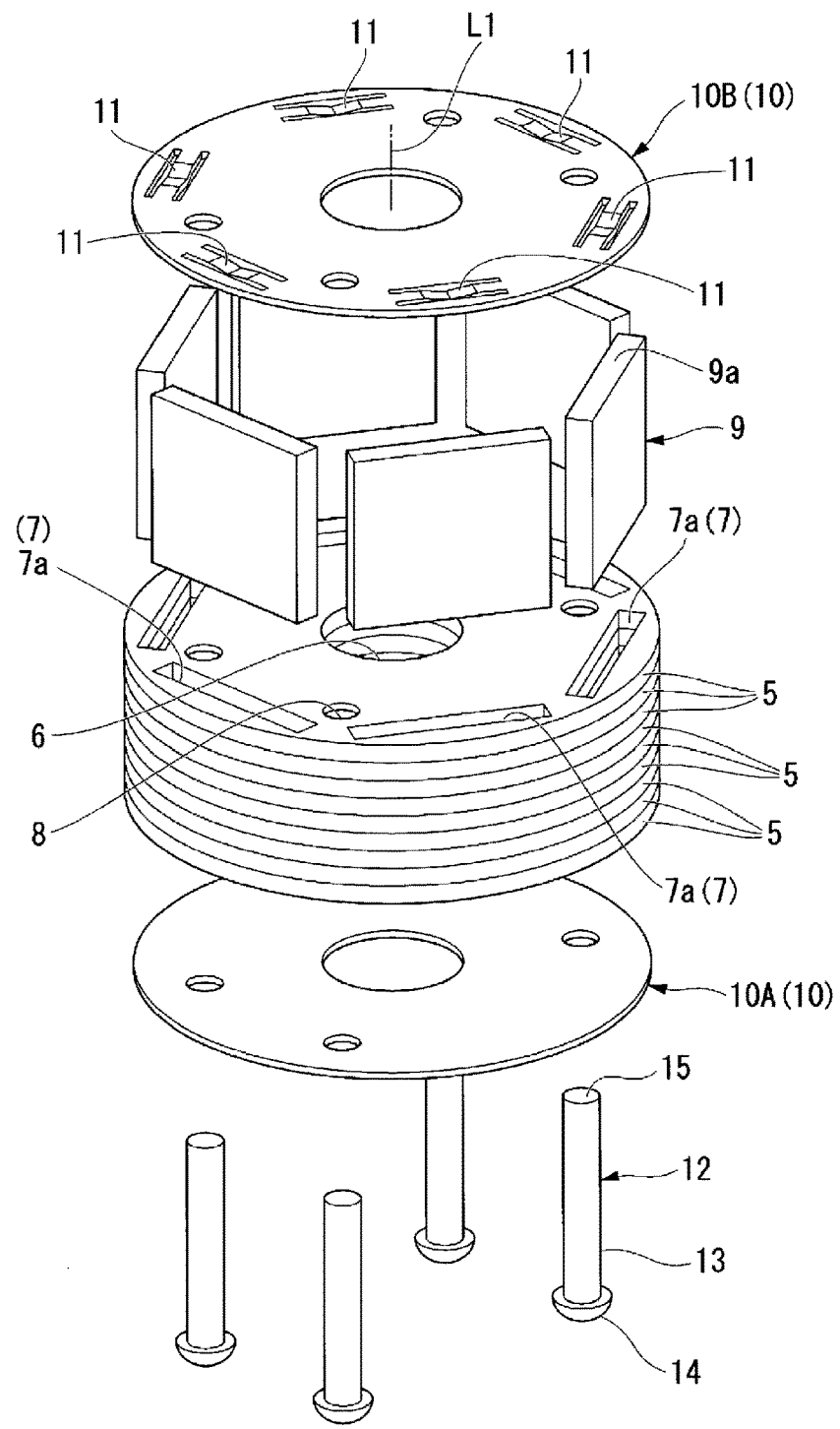
FIG. 5 is an exploded perspective view of the rotor for the motor according to the first embodiment of the present invention.
Figure 6:
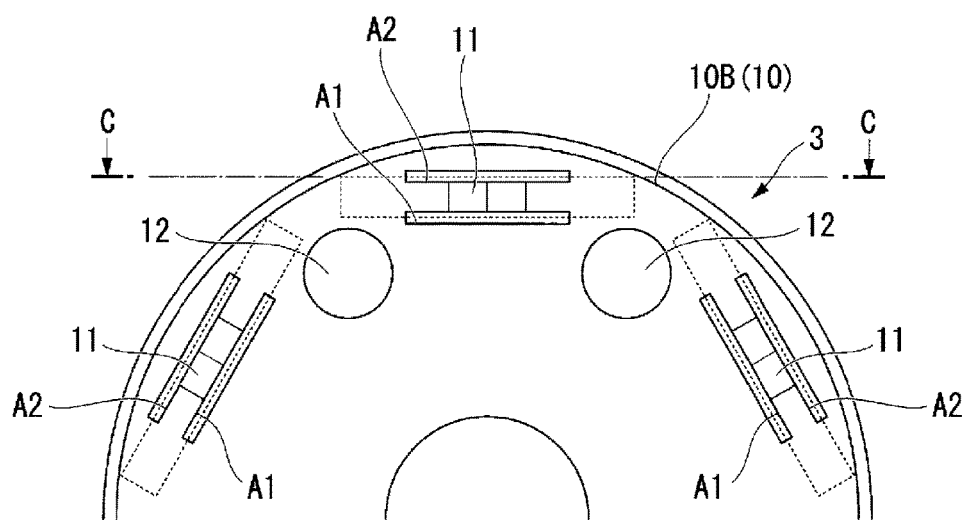
FIG. 6 is a plan view of an enlarged part of the rotor for the motor according to the first embodiment of the present invention.
Figure 7:
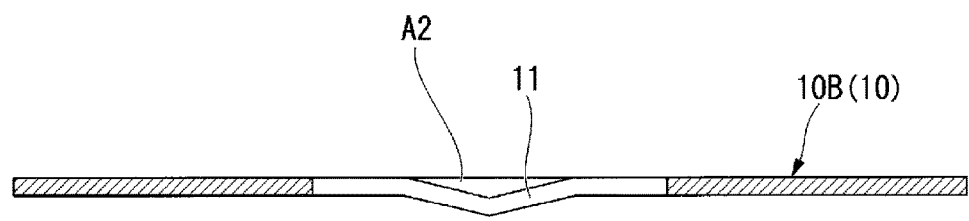
FIG. 7 is a cross-sectional view taken along the line C-C in FIG. 6, illustrating an end plate of the rotor for the motor according to the first embodiment of the present invention.
Figure 8:
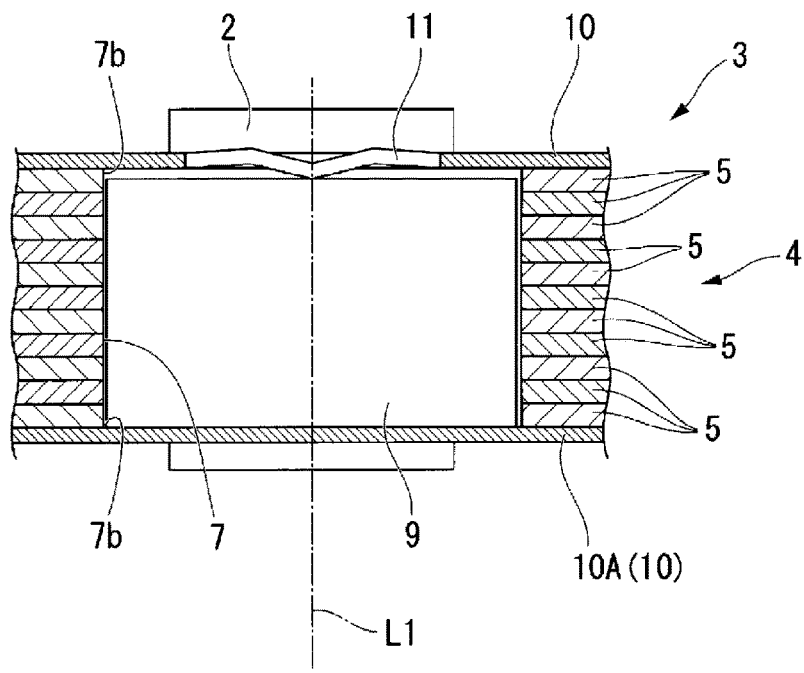
FIG. 8 is a diagram for explaining the operation of the rotor for the motor according to the first embodiment of the present invention, and is a cross-sectional view taken along the line C-C in FIG. 6.

A rotor for a motor according to a first embodiment of the present invention will be described while referring to a motor provided with the rotor for the motor according to the present embodiment as an example. FIG. 1 is a cross-sectional view of the motor provided with the rotor for the motor according to the present embodiment. FIG. 2 is a plan view of the rotor for the motor according to the present embodiment. FIG. 3 is a cross-sectional view taken along the line A-A in FIG. 2. FIG. 4 is a cross-sectional view taken along the line B-B in FIG. 2. FIG. 5 is an exploded perspective view of the rotor for the motor according to the present embodiment. FIG. 6 is a plan view of an enlarged part of the rotor for the motor according to the present embodiment. FIG. 7 is a cross-sectional view taken along the line C-C in FIG. 6 and illustrating an end plate of the rotor for the motor according to the present embodiment. FIG. 8 is a diagram for explaining the operation of the rotor for the motor according to the present embodiment, and is a cross-sectional view taken along the line C-C in FIG. 6.

As illustrated in FIG. 1, a motor 1 of the present embodiment is an inner rotor-type permanent magnet embedded synchronous motor provided with a rotating shaft 2, a rotor 3, a stator 20 arranged on the outer circumference of the rotor 3, and a yoke 21 supporting the rotating shaft 2 and the stator 20.

The rotating shaft 2 is a rod-like member rotatably connected to the yoke 21 and fixed to the rotor 3 for transferring the rotation of the motor 1 to the outside.

As illustrated in FIGS. 2 to 5, the rotor 3 includes a stacked core 4, permanent magnets 9, end plates 10, and connecting members 12.

The stacked core 4 is made of metal steel plates 5 stacked in a direction of an axis L1 of the rotating shaft 2, and is a rotor core having a circular pillar shape as a whole. A stacked body of the steel plates 5 is formed in a cylindrical shape centered around the axis L1 of the rotating shaft 2, and has a hole therein into which the rotating shaft 2 is inserted. The stacked core 4 is provided with a shaft insertion groove 6 into which the rotating shaft 2 is inserted, magnet insertion grooves 7 into which the permanent magnets 9 are inserted, and fixing grooves 8 into which the connecting members 12 are inserted.

The shaft insertion groove 6 has a hole having substantially the same diameter as the outer diameter of the rotating shaft 2 and penetrating through the steel plates 5 in the thickness direction thereof.

Each of the magnet insertion grooves 7 is formed in a shape corresponding to the outer shape of the permanent magnet 9, and has a hole penetrating through the steel plates 5 in the thickness direction thereof. The magnet insertion grooves 7 are provided in a plurality of locations in the steel plates 5, so as to be rotationally symmetrical around the axis L1 of the rotating shaft 2. In the present embodiment, the magnet insertion grooves 7 are provided in six locations around the axis L1 of the rotating shaft 2, at intervals of 60 degrees in the circumferential direction.

Each of the fixing grooves 8 has a hole having substantially the same diameter as that of a shaft portion 13 of the connecting member 12 and penetrating through the steel plates 5 in the thickness direction thereof.

In the present embodiment, the shaft insertion groove 6, the magnet insertion grooves 7, and the fixing grooves 8 are provided in all of the steel plates 5. Each of the shaft insertion groove 6, the magnet insertion grooves 7, and the fixing grooves 8 is a through-hole penetrating through the stacked core 4, which is formed in the circular pillar shape, in the direction of the axis L1 of the rotating shaft 2.

Each of the permanent magnets 9 is a magnet arranged inside the magnet insertion groove 7. The outer shape of the permanent magnet 9 corresponds to the shape of inner surfaces 7a of the magnet insertion groove 7. In order to enable the permanent magnets 9 to be easily inserted into the magnet insertion grooves 7, dimensions of the permanent magnets 9 are set to be smaller than those of the magnet insertion grooves 7 such that outer surfaces 9a of each of the permanent magnets 9 are separated from the inner surfaces 7a of each of the magnet insertion grooves 7.

The end plates 10 are substantially disc-like members, and two of the end plates 10 are provided such that the stacked core 4 is interposed therebetween in the direction of the axis L1 of the rotating shaft 2. One of the two end plates 10 (a first end plate 10A) is a plate-like member that covers the magnet insertion grooves 7. The other of the two end plates 10 (a second end plate 10B) has pressing portions 11 formed in positions corresponding to openings 7b of the magnet insertion grooves 7 when the second end plate 10B is attached to the stacked core 4. Each of the pressing portions 11 is formed by part of the second end plate 10B being deformed such that the pressing portion 11 enters into the interior of the magnet insertion groove 7.

As illustrated in FIGS. 6 and 7, each of the pressing portions 11 has notches A1 and A2, which are respectively formed in sections of the pressing portion 11 closer to the rotating shaft 2 and further away from the rotating shaft 2, with respect to the positions corresponding to the openings 7b of the magnet insertion grooves 7 when the second end plate 10B is attached to the stacked core 4. Further, a section of the second end plate 10B positioned between the notches A1 and A2 is bent such that this section is formed in a convex shape oriented toward the first end plate 10A from the second end plate 10B.

As illustrated in FIGS. 7 and 8, the pressing portion 11 is a spring 16 that deforms by being pressed by the permanent magnet 9 in a direction that causes the pressing portion 11 to adopt a flat-plate shape and that return to its original convex shape as a result of the elasticity of the second end plate 10B itself. The pressing portion 11 is elastically deformed as a result of being pressed by the permanent magnet 9, in a state in which the permanent magnet 9 is inserted into the magnet insertion groove 7 of the stacked core 4. In a state in which the permanent magnet 9 is pressed against the first end plate 10A, the movement of the permanent magnet 9 in the direction of the axis L1 of the rotating shaft 2 is regulated by a force generated as a result of the pressing portion 11, which has deformed as a result of being pressed by the permanent magnet 9, trying to return to its original shape.

As illustrated in FIGS. 2 to 5, each of the connecting members 12 includes the shaft portion 13 inserted into the stacked core 4 and the fixing grooves 8 of the end plates 10, a first large diameter portion 14 arranged at one end of the shaft portion 13, and a second large diameter portion 15 arranged at the other end of the shaft portion 13. The connecting member 12 of the present embodiment is a rivet that connects and fixes the two end plates 10 together, in a state in which the stacked core 4 and the permanent magnets 9 are interposed between the end plates 10.

Next, the operation of the rotor 3 of the present embodiment will be described.

As illustrated in FIG. 8, the permanent magnet 9 is arranged inside the magnet insertion groove 7 provided in the stacked core 4 of the rotor 3. The permanent magnet 9 is pressed against the first end plate 10A by the pressing portion 11 provided in the second end plate 10B. Thus, the movement of the permanent magnet 9 in the direction of the axis L1 of the rotating shaft 2 is regulated by a force received from the pressing portion 11. Further, since the permanent magnet 9 is in a state of being interposed between the first end plate 10A and the pressing portion 11, the movement of the permanent magnet 9 in a direction orthogonal to the direction of the axis L1 of the rotating shaft 2 is regulated by a frictional force between the permanent magnet 9 and the first end plate 10A and a frictional force between the permanent magnet 9 and the pressing portion 11. Specifically, the pressing portion 11 restrains the permanent magnet 9 in the direction of the axis L1 by pressing the permanent magnet 9 in the direction of the axis L1.

Thus, in the present embodiment, even though the gap required to insert each of the permanent magnets 9 into each of the magnet insertion grooves 7 at the time of manufacturing the rotor 3 is provided between the magnet insertion groove 7 and the permanent magnet 9, a change in rotation balance caused by the permanent magnets 9 being positionally displaced when the rotor 3 rotates around the axis L1 of the rotating shaft 2 is unlikely to occur.

As described above, since the rotation balance is unlikely to change, the rotor 3 of the present embodiment operates with low vibration and noise when the rotor 3 rotates.

Further, even when the temperature of each part changes due to heat generated by the motor 1 and the like, since the pressing portions 11 act as a buffer against the expansion and contraction of the magnet insertion grooves 7 and the permanent magnets 9, thermal stress is unlikely to occur, and the movement of the permanent magnets 9 inside the stacked core 4 can be suppressed.

Modified Example 1-1

Figure 9:
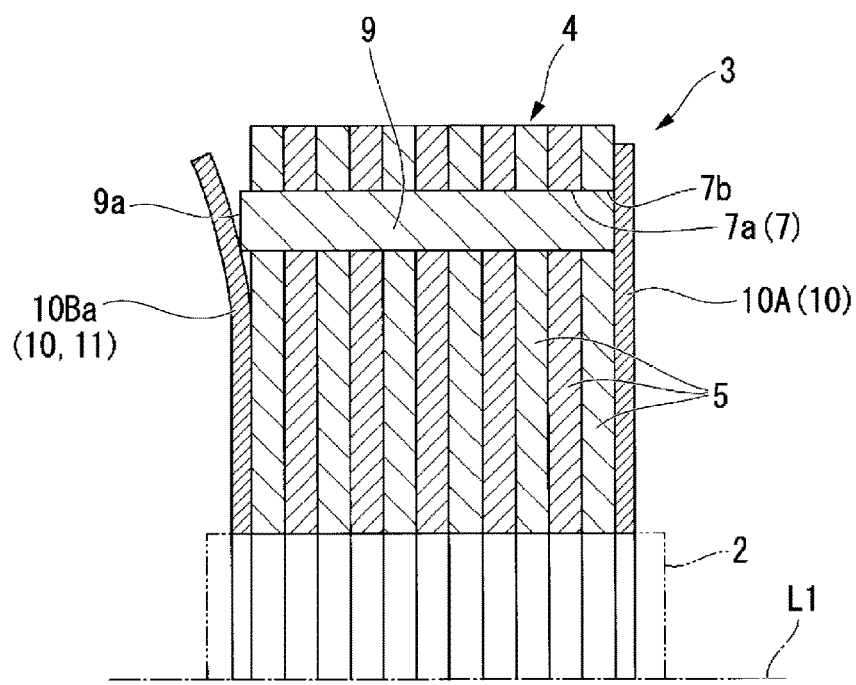
FIG. 9 is a cross-sectional view of a part of the rotor for the motor according to a modified example of the first embodiment of the present invention.

Another example of the pressing portion 11 disclosed in the above-described embodiment will be described. FIG. 9 is a cross-sectional view of a part of the rotor for the motor according to the present modified example.

For example, as illustrated in FIG. 9, the pressing portion 11 may be an elastic member having a planar shape that is in contact with the permanent magnet 9 protruding from an opening of the magnet insertion groove 7 in the direction of the axis L1 of the rotating shaft 2. As an example, instead of the second end plate 10B disclosed in the first embodiment, a second end plate 10Ba is provided, of which a part of an elastic member having a disc shape and a constant thickness functions as the pressing portion 11, and the second end plate 10Ba itself becomes the pressing portion 11. In the present modified example, the second end plate 10Ba is more flexible than the first end plate 10A.

In the present modified example, a part of the permanent magnet 9 protrudes from the magnet insertion groove 7 of the stacked core 4 and abuts against each of the first end plate 10A and the second end plate 10Ba. As a result, the first end plate 10A adopts a flat-plate shape, and the second end plate 10Ba is deformed by the elasticity of the second end plate 10Ba so as to curve upward. The movement of the permanent magnet 9 is regulated by a restoring force generated as a result of the second end plate 10Ba trying to return to its original flat-plate shape such that the permanent magnet 9 does not move inside the magnet insertion groove 7. Further, the restoring force generated as a result of the second end plate 10Ba trying to return to its original flat-plate shape turns into a force that presses the permanent magnet 9 toward a direction in which the permanent magnet 9 moves away from the rotating shaft 2. Thus, the second end plate 10Ba operates so as to move the permanent magnet 9 in advance in the direction of a centrifugal force that acts on the permanent magnet 9 as a result of the rotation of the rotor 3.

Modified Example 1-2

Figure 10:
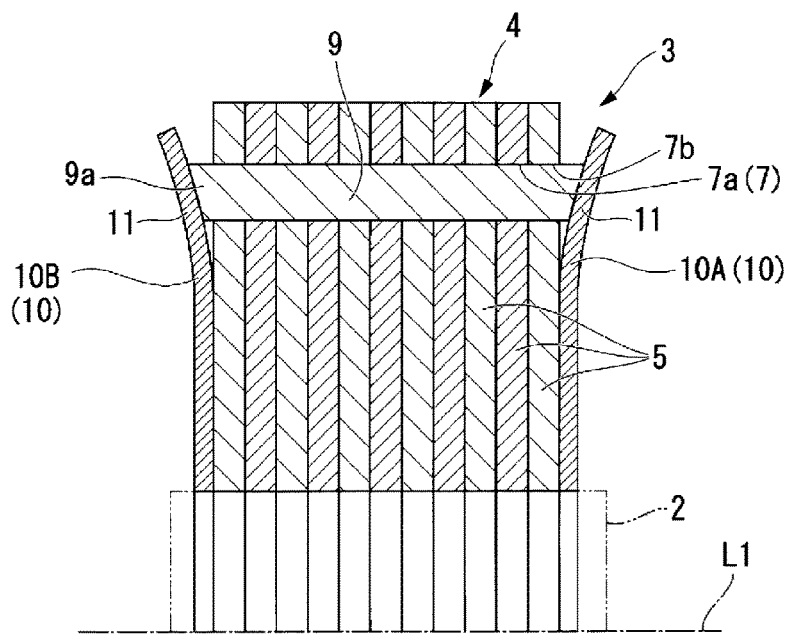
FIG. 10 is a cross-sectional view of a part of the rotor for the motor according to a modified example of the first embodiment of the present invention.

Yet another example of the pressing portion 11 disclosed in the above-described embodiment will be described. FIG. 10 is a cross-sectional view of a part of the rotor for the motor according to the present modified example.

As illustrated in FIG. 10, the present modified example has the end plates 10 (the first end plate 10A and the second end plate 10B) disclosed in the above-described first embodiment, and the permanent magnet 9, which is set to have dimensions that cause a part of the permanent magnet 9 to protrude from the magnet insertion groove 7 of the stacked core 4, is arranged in the magnet insertion groove 7. Further, the outer surfaces 9a of the permanent magnet 9 are formed to correspond to upwardly-curved shapes of the first end plate 10A and the second end plate 10B, such that the permanent magnet 9 makes surface contact with the first end plate 10A and the permanent magnet 9 makes surface contact with the second end plate 10B. Specifically, of the outer surfaces 9a of the permanent magnet 9, the surface oriented toward the first end plate 10A and the surface oriented toward the second end plate 10B are each formed as a flat surface inclined with respect to the axis L1 of the rotating shaft 2.

In the present modified example, parts of the permanent magnet 9 protrude from the magnet insertion groove 7 of the stacked core 4 and abut against each of the first end plate 10A and the second end plate 10B. As a result, both the first end plate 10A and the second end plate 10B are deformed so as to curve upward, by being pressed by the permanent magnet 9. The movement of the permanent magnet 9 is regulated by a restoring force generated as a result of each of the first end plate 10A and the second end plate 10B trying to return to its original flat-plate shape, such that the permanent magnet 9 does not move inside the magnet insertion groove 7.

Further, in the present modified example, the restoring force generated as a result of each of the first end plate 10A and the second end plate 10B trying to return to its original flat-plate shape turns into the force that presses the permanent magnet 9 toward the direction in which the permanent magnet 9 moves away from the rotating shaft 2. Thus, each of the first end plate 10A and the second end plate 10B operates so as to move the permanent magnet 9 in advance in the direction of the centrifugal force that acts on the permanent magnet 9 as a result of the rotation of the rotor 3.

Further, in the present modified example, since each of the first end plate 10A and the second end plate 10B is in surface contact with the permanent magnet 9, the permanent magnet 9 does not easily slip with respect to the first end plate 10A and the second end plate 10B, and further, the permanent magnet 9 does not easily become chipped.

Modified Example 1-3

Figure 11:
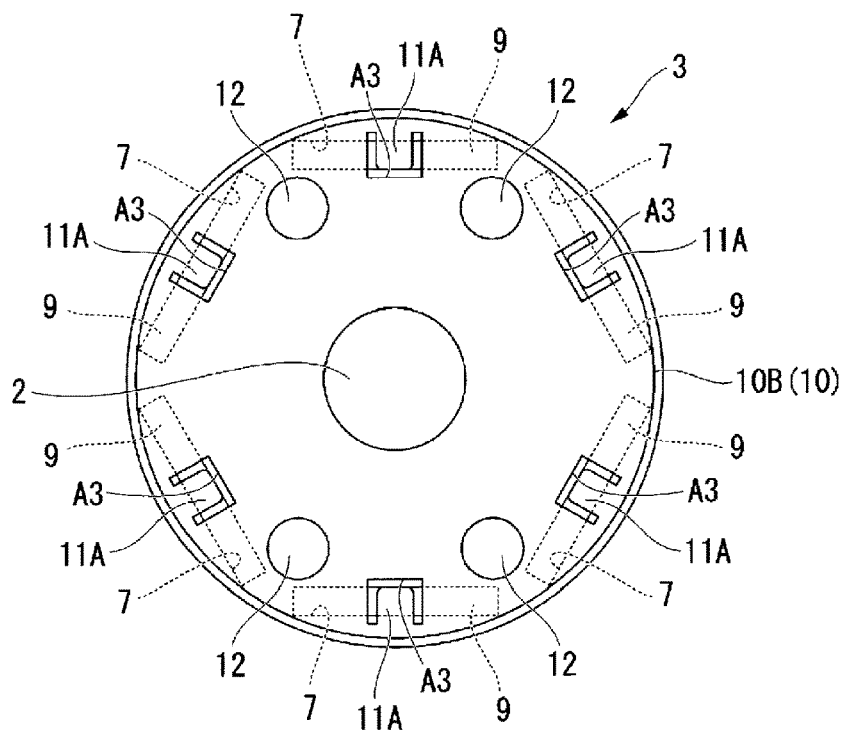
FIG. 11 is a plan view of a part of the rotor for the motor according to a modified example of the first embodiment of the present invention.
Figure 12:
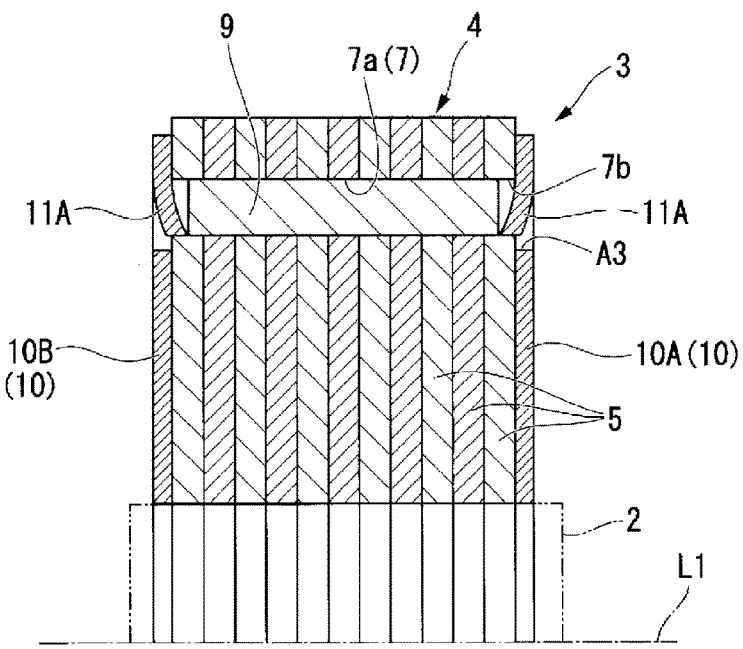
FIG. 12 is a cross-sectional view of a part of the rotor for the motor according to the modified example of the first embodiment of the present invention.

Yet another example of the pressing portion 11 disclosed in the above-described embodiment will be described. FIG. 11 is a plan view of the rotor for the motor according to the present modified example. FIG. 12 is a cross-sectional view of a part of the rotor for the motor according to the present modified example.

As illustrated in FIG. 11, in the present modified example, pressing portions 11A are provided, each of which has a different shape from that of the pressing portion 11 disclosed in the first embodiment. Each of the pressing portions 11A has a notch A3, which is formed in a U-shape in a position corresponding to the opening 7b of the magnet insertion groove 7 when the second end plate 10B is attached to the stacked core 4. The U shape is formed by a section of the notch A3 on the side closer to the rotating shaft 2 extending in the substantially circumferential direction of the second end plate 10B and both ends of this section extending in the direction away from the rotating shaft 2. Specifically, each of the pressing portions 11A is formed so as to be bent toward the first end plate 10A side.

Further, in the present modified example, the pressing portions 11A are also provided in the first end plate 10A.

Each of the pressing portions 11A elastically deforms as a result of being pressed by the permanent magnet 9 in the same manner as in the first embodiment, and a restoring force of the pressing portion 11A presses the permanent magnet 9 against the first end plate 10A. With this type of configuration, the same effect as in the first embodiment can also be obtained.

Note that the pressing portions 11A disclosed in the present modified example may be provided in the first end plate 10A and bent toward the second end plate 10B side. Further, the pressing portions 11A disclosed in the present modified example may be provided in both of the first end plate 10A and the second end plate 101B.

Modified Example 1-4

Figure 13:
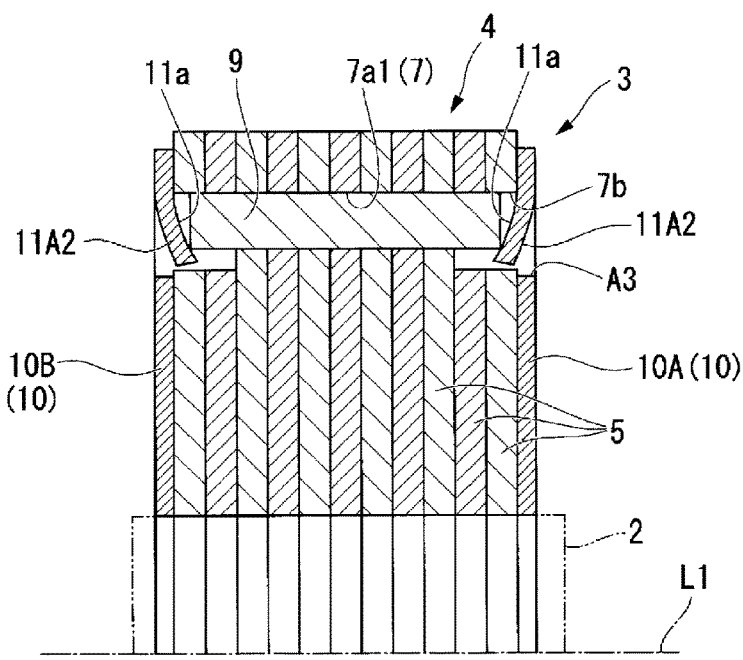
FIG. 13 is a cross-sectional view of a part of the rotor for the motor according to a modified example of the first embodiment of the present invention.

Yet another example of the pressing portion 11 disclosed in the above-described embodiment will be described. FIG. 13 is a cross-sectional view of a part of the rotor for the motor according to the present modified example.

In the present modified example, instead of the pressing portions 11A disclosed in the above-described modified example 1-3, as illustrated in FIG. 13, pressing portions 11A2 are provided in the first end plate 10A and the second end plate 10B. Each of the pressing portions 11A2 holds the permanent magnet 9 so as to press the permanent magnet 9 against a surface 7a1, of the inner surfaces 7a of the magnet insertion groove 7, that faces the rotating shaft 2 and that is located on the side further away from the axis L1 of the rotating shaft 2.

Each of the pressing portions 11A2 provided in the first end plate 10A has a contact surface 11a that is inclined toward the direction moving away from the axis L1 of the rotating shaft 2 in relation to the direction from the first end plate 10A toward the second end plate 10B. This contact surface 11a abuts against the permanent magnet 9. A force of the pressing portion 11A2 that presses the permanent magnet 9 acts on the permanent magnet 9 while being split into a force that tries to move the permanent magnet 9 in the direction of the axis L1 of the rotating shaft 2 and a force that tries to move the permanent magnet 9 in the direction moving away from the axis L1 of the rotating shaft 2.

Each of the pressing portions 11A2 provided in the second end plate 10B has the contact surface 11a that is inclined toward the direction moving away from the axis L1 of the rotating shaft 2 in relation to the direction from the second end plate 10B toward the first end plate 10A. This contact surface 11a abuts against the permanent magnet 9. A force of the pressing portion 11A2 that presses the permanent magnet 9 acts on the permanent magnet 9 while being split into a force that tries to move the permanent magnet 9 in the direction of the axis L1 of the rotating shaft 2 and a force that tries to move the permanent magnet 9 in the direction moving away from the axis L1 of the rotating shaft 2.

According to the pressing portions 11A2 respectively provided in the first end plate 10A and the second end plate 10B, pressing forces thereof are balanced against each other with respect to the movement of the permanent magnet 9 in the direction of the axis L1 of the rotating shaft 2, and with respect to the direction moving away from the axis L1 of the rotating shaft 2, the pressing forces press the permanent magnet 9 against the surface 7a1, of the inner surfaces 7a of the magnet insertion groove 7, that faces the rotating shaft 2 and that is located on the side further away from the axis L1 of the rotating shaft 2.

As a result, in the present modified example, the movement of the permanent magnet 9 inside the magnet insertion groove 7 is regulated by the pressing portions 11A2 that are respectively provided in the first end plate 10A and the second end plate 10B such that the permanent magnet 9 does not move with respect to the magnet insertion groove 7, in a state in which the permanent magnet 9 has been moved in advance in the direction of the centrifugal force generated when the rotor 3 rotates.

Modified Example 1-5

Figure 14:
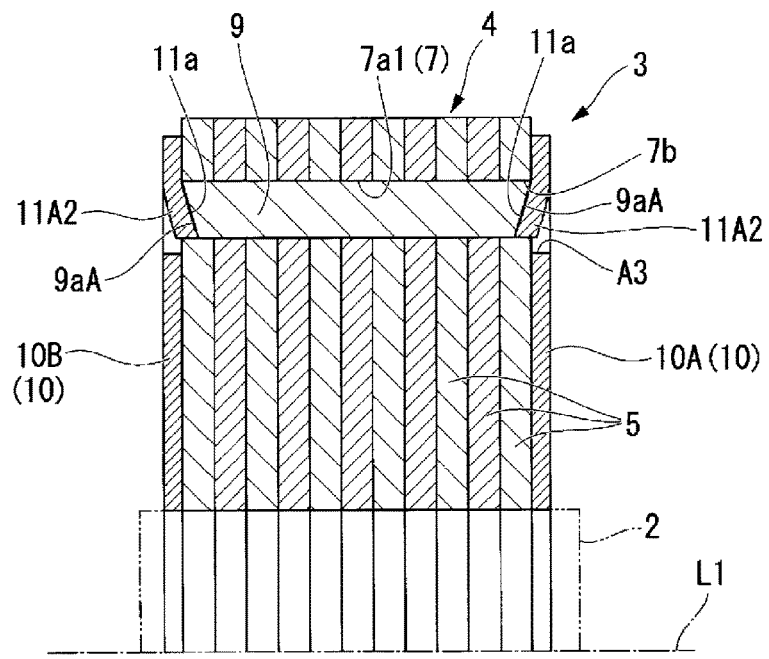
FIG. 14 is a cross-sectional view of a part of the rotor for the motor according to a modified example of the first embodiment of the present invention.

Yet another example of the pressing portion 11 disclosed in the above-described embodiment will be described. FIG. 14 is a cross-sectional view of a part of the rotor for the motor according to the present modified example.

In the present modified example, with respect to the above-described modified example 1-4, as illustrated in FIG. 14, contact receiving surfaces 9aA, which are formed to substantially correspond to the inclined state of the contact surfaces 11a of the second end plate 10B, are provided on the outer surfaces 9a of the permanent magnet 9 so as to be substantially parallel to the contact surfaces 11a of the pressing portions 11A2.

With the present modified example, the same effect as in the above-described modified example 1-4 is also obtained.

Modified Example 1-6

Figure 15:
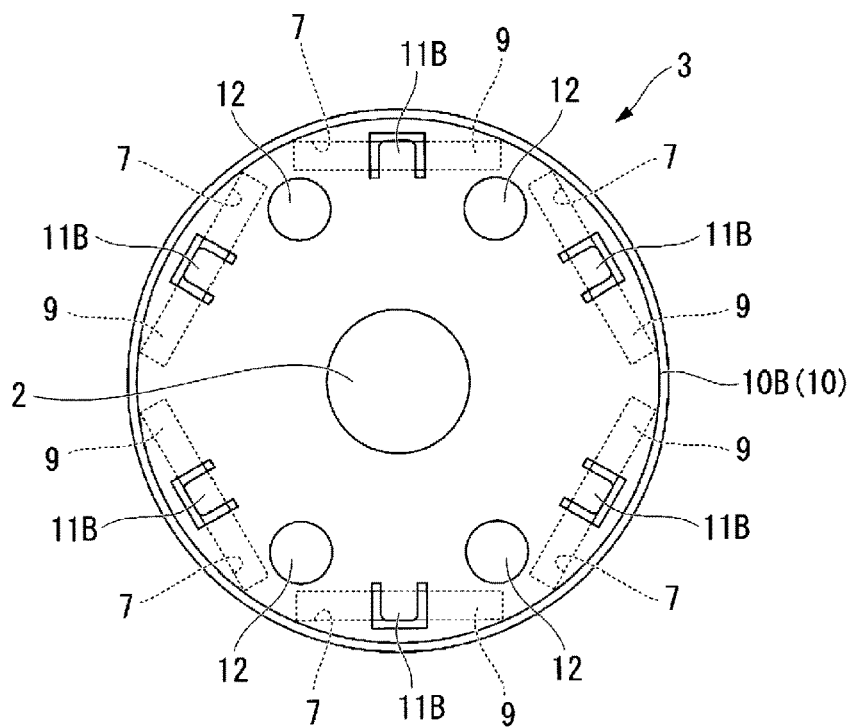
FIG. 15 is a plan view of a part of the rotor for the motor according to a modified example of the first embodiment of the present invention.
Figure 16:
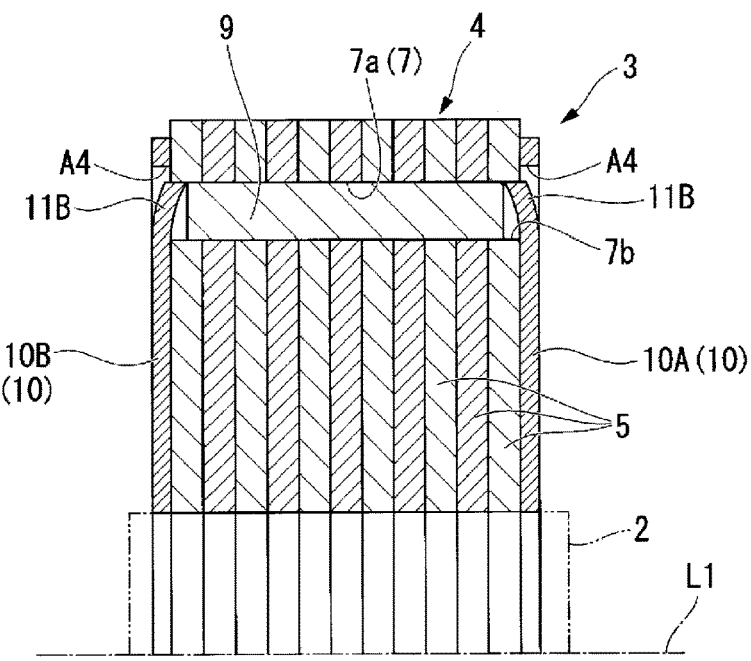
FIG. 16 is a cross-sectional view of a part of the rotor for the motor according to the modified example of the first embodiment of the present invention.

Yet another example of the pressing portion 11 disclosed in the above-described embodiment will be described. FIG. 15 is a plan view of the rotor for the motor according to the present modified example. FIG. 16 is a cross-sectional view of a part of the rotor for the motor according to the present modified example.

As illustrated in FIGS. 15 and 16, in the present modified example, instead of the pressing portions 11 disclosed in the first embodiment, pressing portions 11B are provided, each of which has a different shape from that of the pressing portion 11 disclosed in the first embodiment. Each of the pressing portions 11B has a notch A4, which is formed in a U-shape, in the position corresponding to the opening 7b of the magnet insertion groove 7 when the second end plate 10B is attached to the stacked core 4. The U shape is formed by a section of the notch A4 on the side away from the rotating shaft 2 extending in the circumferential direction of the second end plate 10B and both ends of this section extending in the direction approaching the rotating shaft 2. Specifically, the pressing portions 11B are formed so as to be bent toward the first end plate 10A side.

Each of the permanent magnets 9 of the present modified example is formed such that a part of a surface of the permanent magnet 9, which extends in a direction that intersects with an inclination direction of a bent section of the pressing portion 11B, comes into contact with the pressing portion 11B.

Each of the pressing portions 11B elastically deforms as a result of being pressed by the permanent magnet 9 in the same manner as in the first embodiment, and a restoring force of the pressing portion 11B presses the permanent magnet 9 against the first end plate 10A. With this type of configuration, the same effect as in the first embodiment can also be obtained. Further, in a state in which the pressing portions 11B are in contact with the permanent magnets 9, the pressing portions 11B can regulate the movement of the permanent magnets 9 so as to inhibit the permanent magnets 9 from moving in the direction approaching the rotating shaft 2.

Note that the pressing portions 11B disclosed in the present modified example may be provided in the first end plate 10A and bent toward the second end plate 10B side. Further, the pressing portions 11B disclosed in the present modified example may be provided in both of the first end plate 10A and the second end plate 10B.

Second Embodiment

Next, a second embodiment of the present invention will be described. Note that, with respect to each of embodiments to be described below, the same components as those described in the first embodiment will be denoted using the same reference signs as those in the first embodiment, and the same descriptions as those in the first embodiment will be omitted.

Figure 17:
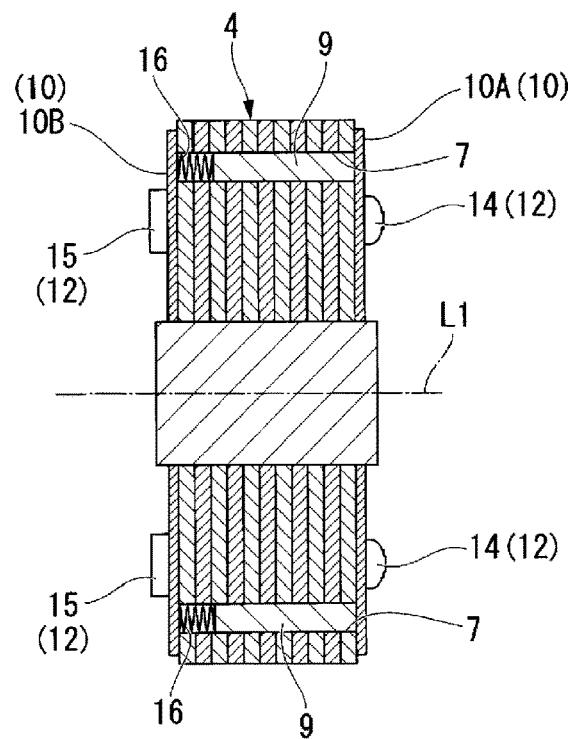
FIG. 17 is a diagram illustrating a rotor for the motor according to a second embodiment of the present invention, and is a cross-sectional view illustrating the same cross section as taken along the line B-B in FIG. 2.
Figure 18:
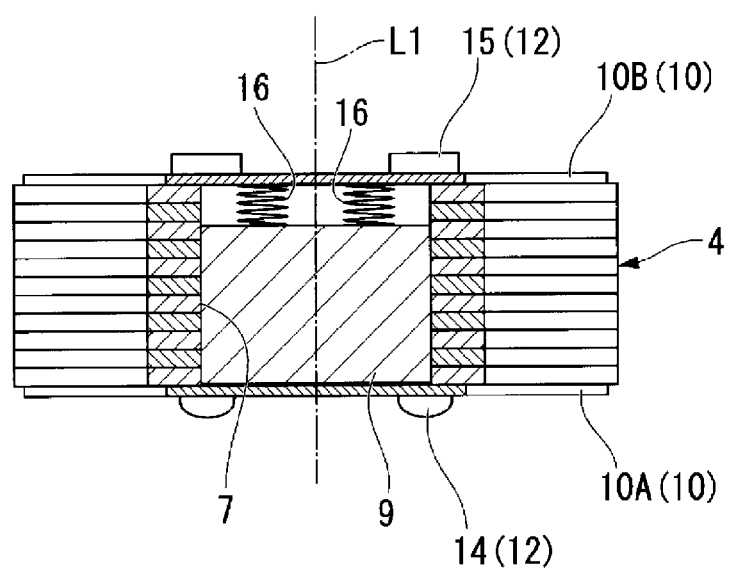
FIG. 18 is an explanatory diagram for explaining the operation of the rotor for the motor according to the second embodiment of the present invention.

FIG. 17 is a diagram illustrating a rotor for a motor according to the second embodiment of the present invention, and is a cross-sectional view illustrating the same cross section as taken along the line B-B in FIG. 2. FIG. 18 is an explanatory diagram for explaining the operation of the rotor for the motor according to the present embodiment.

As illustrated in FIGS. 17 and 18, in a rotor 3A of the present embodiment, instead of the pressing portions disclosed in the above-described first embodiment and each of the modified examples thereof, the springs 16 are each provided as a different member to the end plates 10 and provided separately from the end plates 10.

Each of the springs 16 is an elastic member that can expand and contract in the direction of the axis L1 of the rotation shaft 2 (see FIG. 1). In the present embodiment, the spring 16 is a compression coil spring whose center line is oriented in the direction of the axis L1 of the rotation axis 2.

Each of the springs 16 is arranged inside the magnet insertion groove 7 so as to be interposed between the second end plate 10B and the permanent magnet 9. The springs 16 are elastically deformed by the second end plate 10B and the permanent magnet 9 in a compression direction, in a state in which the end plates 10 are fixed to the stacked core 4. The permanent magnet 9 is pressed against the first end plate 10A by a restoring force generated as a result of the spring 16, which is elastically deformed by the second end plate 10B and the permanent magnet 9 in the compression direction, trying to return to its original shape. The spring 16 of the present embodiment is a member that presses the permanent magnet 9 in the direction of the axis L1 of the rotating shaft 2. The movement of the permanent magnet 9 in the direction of the axis L1 of the rotating shaft 2 is regulated by the restoring force generated as a result of the spring 16, which is elastically deformed by the second end plate 10B and the permanent magnet 9 in the compression direction, trying to return to its original shape.

Further, since the permanent magnet 9 is in a state of being interposed between the first end plate 10A and the spring 16, the movement of the permanent magnet 9 in the direction orthogonal to the direction of the axis L1 of the rotating shaft 2 is regulated by the frictional force between the permanent magnet 9 and the first end plate 10A. Thus, in the present embodiment, even though the gap required to insert each of the permanent magnets 9 into each of the magnet insertion grooves 7 at the time of manufacturing the rotor 3 is provided between the magnet insertion groove 7 and the permanent magnet 9, a change in rotation balance caused by the permanent magnets 9 being positionally displaced when the rotor 3 rotates around the axis L1 of the rotating shaft 2 is unlikely to occur.

As described above, since the rotation balance is unlikely to change, the rotor 3 of the present embodiment operates with low vibration and noise when the rotor 3 rotates.

Further, even when the temperature of each part changes due to heat generated by the motor 1 and the like, since the springs 16 act as the buffer against expansion and contraction of the magnet insertion grooves 7 and the permanent magnets 9, the thermal stress is unlikely to occur, and the movement of the permanent magnets 9 inside the rotor core can be suppressed.

Modified Example 2-1

Figure 19:
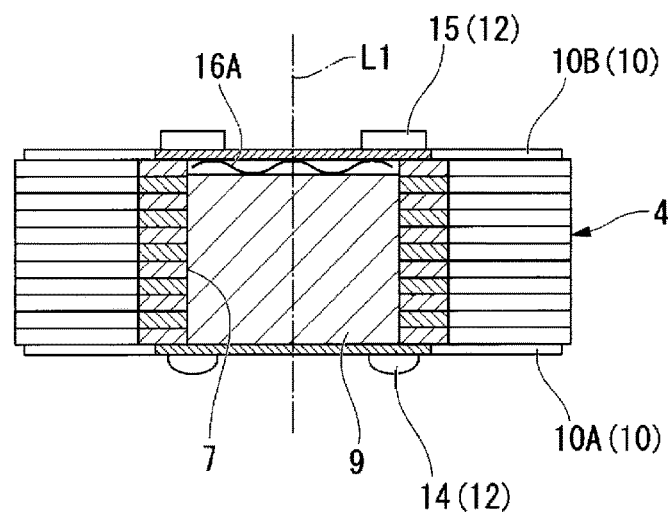
FIG. 19 is a cross-sectional view of a part of the rotor for the motor according to a modified example of the second embodiment of the present invention.

Another example of the pressing portion 11 disclosed in the above-described embodiment will be described. FIG. 19 is a cross-sectional view of a part of the rotor for the motor according to the present modified example.

The spring 16 interposed between the second end plate 10B and the permanent magnet 9 is not limited to the compression coil spring. For example, as illustrated in FIG. 19, instead of the above-described spring 16, which is the compression coil spring, even when a flat spring 16A is provided so as to be interposed between the second end plate 10B and the permanent magnet 9 in a state of being elastically deformed by the second end plate 10B and the permanent magnet 9, the same effect as in the above-described second embodiment can be obtained.

Modified Example 2-2

Figure 20:
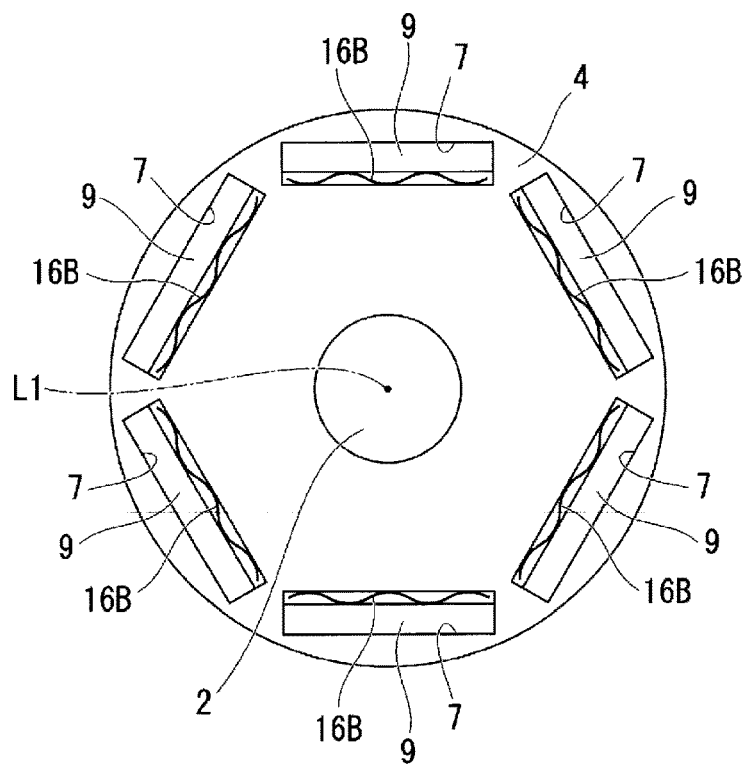
FIG. 20 is a cross-sectional view of a part of the rotor for the motor according to a modified example of the second embodiment of the present invention.

Another example of the pressing portion 11 disclosed in the above-described embodiment will be described. FIG. 20 is a cross-sectional view of a part of the rotor for the motor according to the present modified example.

As illustrated in FIG. 20, the present modified example is different from the second embodiment in the fact that flat springs 16B, which press the permanent magnets 9 in the direction away from the rotating shaft 2, are interposed between the permanent magnets 9 and the magnet insertion grooves 7.

As a result, in the present modified example, the movement of each of the permanent magnets 9 inside the magnet insertion groove 7 is regulated by the flat spring 16B, such that the permanent magnet 9 does not move with respect to the magnet insertion groove 7 in a state in which the permanent magnet 9 has been moved in advance in the direction of the centrifugal force generated when the rotor 3 rotates.

Third Embodiment

Figure 21:
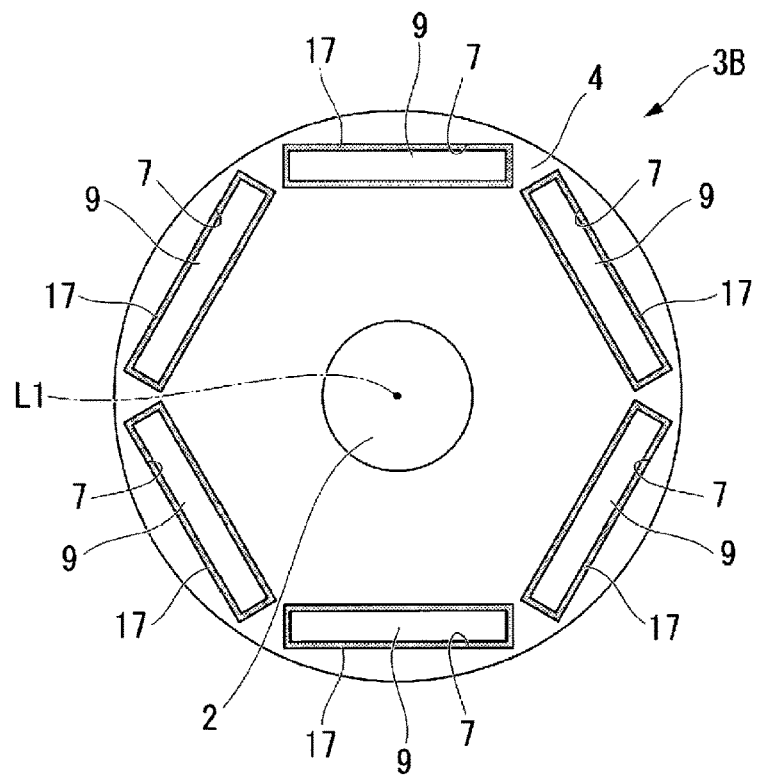
FIG. 21 is a plan view of a stacked core in a rotor for the motor according to a third embodiment of the present invention.
Figure 22:
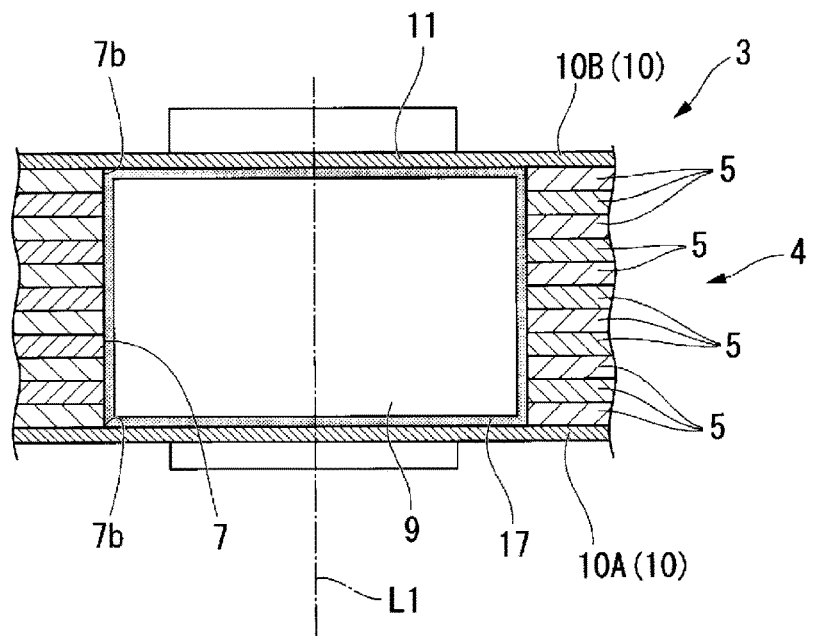
FIG. 22 is an explanatory diagram for explaining the operation of the rotor for the motor according to the third embodiment of the present invention.

Next, a third embodiment of the present invention will be described. FIG. 21 is a plan view of the stacked core in a rotor for the motor according to the third embodiment of the present invention. FIG. 22 is an explanatory diagram for explaining the operation of the rotor for the motor according to the present embodiment.

As illustrated in FIGS. 21 and 22, a rotor 31 of the present embodiment is different from the above-described first embodiment and second embodiment in the fact that each of the permanent magnets 9 inside the magnet insertion grooves 7 is sealed by a filler 17.

The filler 17 of the present embodiment has fluidity during a filling operation, and after the filling operation, the filler 17 hardens while maintaining some flexibility. The filler 17 is formed of a conductive material. Examples of the material of the filler 17 include a conductive paste containing conductive particles as filler.

In the present embodiment, the permanent magnets 9 inside the magnet insertion grooves 7 are supported by the filler 17 so as not to move inside the magnet insertion grooves 7. Further, since the filler 17 hardens while maintaining some flexibility, the thermal stress is unlikely to occur, and the movement of the permanent magnets 9 inside the rotor core can be suppressed.

The embodiments of the present invention have been described above in detail with reference to the drawings, but the specific configurations are not limited to those embodiments, and design changes and the like that do not depart from the scope of the present invention are also included.

For example, although, in some of the above-described embodiments and the modified example, the pressing portions 11 are illustrated that press the permanent magnets 9 in the direction of the centrifugal force that acts on the permanent magnets 9 when the rotor 3 rotates, the change in the rotation balance of the rotor 3 can be suppressed to a low level as long as the pressing portions 11 together press all of the plurality of permanent magnets 9 either in the direction of the centrifugal force or in the opposite direction thereto.

Further, the structural members illustrated in each of the above-described embodiments and modified examples can be configured by being combined with each other as appropriate.

INDUSTRIAL APPLICABILITY

According to the above-described rotor for the motor and the above-described motor, vibration and noise can be reduced.

REFERENCE SIGNS LIST

1 Motor
2 Rotating shaft
3 Rotor (rotor for motor)
4 Stacked core (rotor core)
5 Steel plate
6 Shaft insertion groove
7 Magnet insertion groove
8 Fixing groove
9 Permanent magnet
10 End plate
11, 11A, 11A2, 11B Pressing portion
11a Contact surface
11aA Contact receiving surface
12 Connecting portion
13 Shaft portion
14 First large diameter portion
15 Second large diameter portion
16 Spring
16A Flat spring
16B Flat spring
17 Filler
20 Stator
21 Yoke

The invention claimed is:

1. A rotor for a motor, the rotor comprising:
a rotor core made of a plurality of steel plates stacked on top of each other in a direction of an axis of a rotating shaft, having a circular pillar shape centered around the axis, and being provided with a plurality of magnet insertion grooves arranged in a circumferential direction of the rotor and penetrating through the circular pillar shape in the direction of the axis;
permanent magnets respectively inserted into the magnet insertion grooves, said permanent magnets protruding from the magnet insertion grooves in a direction of an axis of the rotating shaft;
a pair of end plates respectively stacked on opposite end surfaces of the rotor core in the direction of the axis and closing the magnet insertion grooves; and
a plurality of pressing portions formed on each of the end plates restraining the permanent magnets in the direction of the axis by pressing the respective permanent magnet in the direction of the axis,
wherein the pressing portions are each a part of the end plate, having elasticity, and pressing the respective permanent magnets in the direction of the axis as a result of the elasticity,
each pressing portion having a contact surface that is oriented toward the permanent magnet, is inclined in a direction moving away from the axis, and comes into contact with the permanent magnet,
the permanent magnets each having a contact receiving surface that is oriented toward the pressing portion, is inclined in a direction approaching the axis, and comes into contact with the contact surface, and
the contact receiving surface having a shape that corresponds to a shape of the contact surface such that the contact surface and the contact receiving surface are in surface contact with each other.

2. A motor comprising: the rotor for the motor according to claim 1;
a stator arranged on an outer circumference of the rotor for the motor; and
a yoke supporting the rotating shaft and the stator.

* * * * *